United States Patent
Carder

[11] Patent Number: 5,934,656
[45] Date of Patent: Aug. 10, 1999

[54] HOLDING APPARATUS FOR USE IN VEHICLE REPAIR

[76] Inventor: Perry M. Carder, 308 Ben-Dov Dr., Marion, Iowa 52302

[21] Appl. No.: 08/910,846

[22] Filed: Aug. 13, 1997

[51] Int. Cl.⁶ ........................................ B25B 1/20
[52] U.S. Cl. ............................ 269/43; 269/45; 269/152; 269/254 R; 269/903
[58] Field of Search ................... 29/758; 269/43, 269/903, 45, 3, 254 R, 152; 24/499, 335, 338

[56] References Cited

U.S. PATENT DOCUMENTS

| | | | |
|---|---|---|---|
| 546,921 | 9/1895 | Duke | 269/45 |
| 574,529 | 1/1897 | Elliott | 269/45 |
| 1,334,971 | 3/1920 | Shore | 269/45 |
| 2,105,954 | 1/1938 | Rippe | 269/43 |
| 2,887,974 | 5/1959 | Weinfeld | 269/45 |
| 3,716,079 | 2/1973 | Marshall | 269/43 |
| 4,070,011 | 1/1978 | Glesser | 269/45 |
| 4,934,222 | 6/1990 | Rittmann et al. | 81/427.5 |

Primary Examiner—Robert C. Watson
Attorney, Agent, or Firm—Allan L. Harms

[57] ABSTRACT

A retaining tool for grasping ends of a broken wire in a wire bundle and maintaining them in fixed relationship, including a thin generally U-shaped body with legs having alligator clips at each end thereof. Spurs are formed along each leg, each spur depending generally perpendicularly from a leg. An optional handle may be formed on the body to extend therefrom. The body may be coated with an electrical insulator or portions thereof may be enclosed by a non-conductive sleeve.

13 Claims, 3 Drawing Sheets

HOLDING APPARATUS FOR USE IN VEHICLE REPAIR

BACKGROUND OF THE INVENTION

In the motor vehicle repair industry, the service technician attempting to locate and repair an electrical problem in the wiring harness of the motor vehicle is confronted with bundles of wires which are tightly wrapped or retained together by cable ties and which are routed through tight spaces. Once the desired wire in the bundle is located, the service technician must separate the subject wire from the bundle in order to get access to the wire to make such repairs as splicing the wire, soldering another wire to it, or adding connectors. Because the bundles are snugly bound and extend to various locations under the dashboard of the vehicle or around the engine compartment, the tension on a single wire in the bundle is fairly substantial and causes the wire to tend to be pulled back into the wire bundle where it cannot be operated upon successfully. If the wire is broken, each separate end is drawn into the bundle making repair very difficult. Existing techniques to prevent a single wire from migrating back into the bundle include having a second technician hold the wire in his or her fingers while the first technician attempts the repair while trying not to injure the second technician. This method requires a second person to be present.

SUMMARY OF THE INVENTION

The present invention provides apparatus including for use in the motor vehicle repair industry to physically isolate the separated ends of a single broken wire from a wire bundle within a motor vehicle so that an effective, safe repair can be accomplished. The invention is also useful in many household and industrial applications to hold discrete objects in defined positions.

A generally U-shaped, relatively non-flexible elongate body is provided with grasping jaw clips such as "alligator" clips at each end. The U-shaped body is constructed of semi-rigid material such that when the ends are forced apart, the body is in tension and attempts to return to its original U-shape. The clips and body may be insulatively coated to prevent electrical conductivity between the wire to be repaired and other contact points in the motor vehicle. The body is preferably a thin generally stiff wire which resists deformation from its original shape. The body may be provided with hooks or spurs on each leg of the body generally adjacent the end clips. These hooks or spurs provide traps to retain the wire harness from the wire to be isolated.

Accordingly, it is an object to provide a tool for use by an automotive repair technician to physically isolate a broken wire from a wiring harness bundle in which the wire is contained. It is another object to provide a tool to allow a single service technician to make a high quality splice of a broken wire in an existing wire harness. It is a further object to assist a service technician to rejoin the ends of a broken wire within a wire harness bundle when limited work space is available. It is another object to provide a tool useful to prevent damage to neighboring wires in a wire bundle while a single wire of the bundle is being repaired. It is a further object of the invention to provide a tool which can secure the ends of a broken wire without risk of electrical shorting. It is a further object to provide a tool to retain a pair of objects in a fixed position. These and other objects of the invention will become apparent from the detailed description below.

DESCRIPTION OF THE DRAWING FIGURES

DETAILED DESCRIPTION OF THE INVENTION

Figure 1:
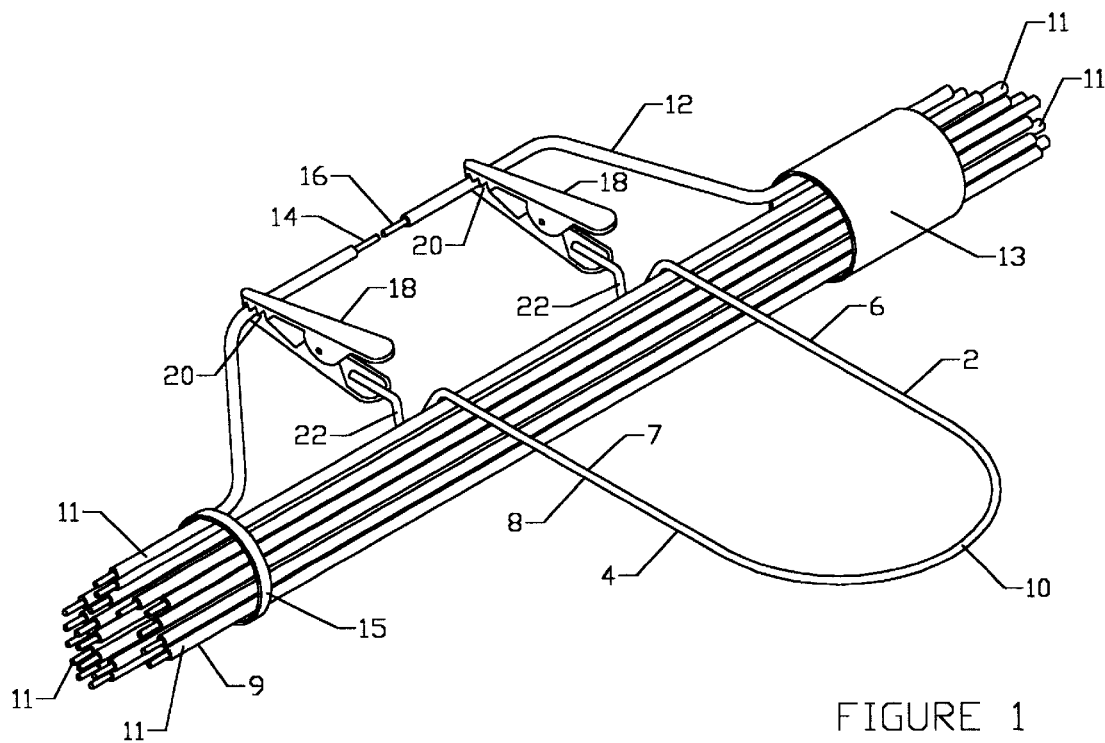
FIG. 1 is a front left perspective of the preferred embodiment of the invention shown in use separating a broken wire from the bundle of wires of which it is a part and grasping the separated ends of the broken wire in juxtaposition.

FIG. 1 illustrates the preferred embodiment of the invention 2 in use with a wire bundle 9 from which broken conductor 12 has been separated. Wire bundle 9 comprises a plurality of conductors 11 and 12 retained together by a sleeve 13 and a cable tie 15. Wire bundles such as wire bundle 9 are frequently used in automobile wiring and typically are threaded through cramped spaces. Broken conductor 12 is shown as having suffered a break along its length resulting in separated ends 14, 16 of broken conductor 12, which interrupt electrical conductivity therealong.

Figure 2:
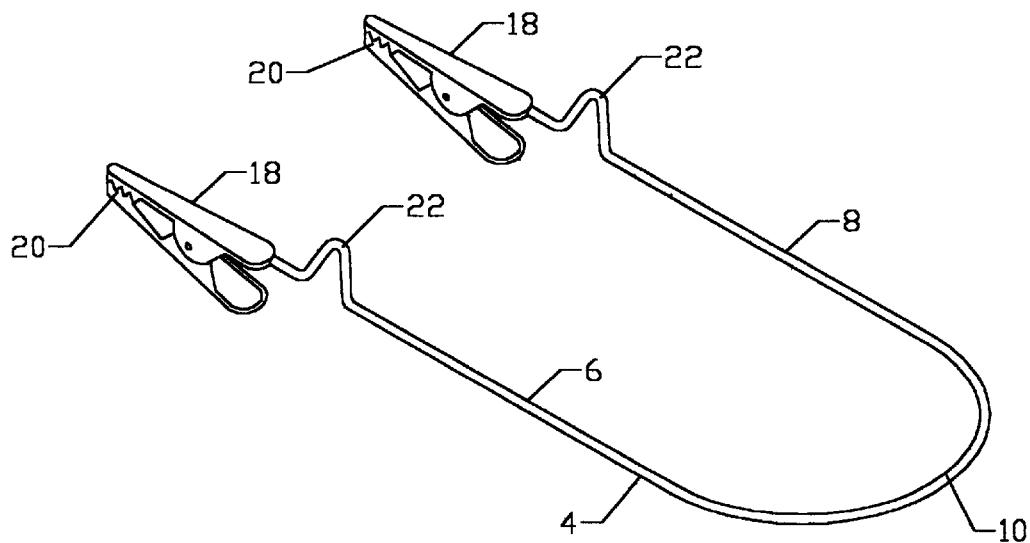
FIG. 2 is a front left perspective of the preferred embodiment of the invention shown inverted from the position in which it is shown in FIG. 1.

Referring to FIG. 2 along with FIG. 1, it can be seen that invention 2 comprises a U-shaped body 4 having spaced apart legs 6 and 8 joined by curved joining segment 10. At the ends of each of legs 6 and 8 are grasping members 18 which in the preferred embodiment are alligator clips having selectively activated spring-loaded jaws 20. The jaws 20 of each of the grasping member 18 are engaged upon one of separated ends 14, 16 of broken conductor 12. Each of legs 6 and 8 is provided with a spur 22 along its length, preferably nearer grasping member 18 than joining segment 10. Spurs 22 depend transversely from the axes of legs 6 and 8 and may be integrally formed open loops which depend perpendicularly from legs 6 and 8. As shown in FIG. 1, when invention 2 is employed with wire bundle 9, the grasping members 18 may be affixed to the separated ends 14, 16 of broken conductor 12 thereby holding separated ends 14, 16 in fixed relationship. Spurs 22 touchingly engage conductors 11 of wire bundle 9 to assist in separating broken conductor 12 from conductors 11. Because of the tension on broken conductor 12, separated ends 14 and 16 tend to be drawn into wire bundle 9. Spurs 22 enable grasping members 18 to prevent separated ends 14 and 16 from rejoining wire bundle 9 while also holding separated ends 14 and 16 in place for rejoining.

Body 4 may be constructed of thin spring steel wire such that legs 6 and 8 will return to a generally co-parallel relationship when allowed to relax, while being capable of selective separation or convergence. By use of such resilient material, grasping members 18 may be forced apart in order to fix each jaw 20 of each grasping member 18 to one of separated ends 14 and 16 and to draw separated ends 14 and 16 toward one another by the tensile strength of body 4. Legs 6, 8, joining segment 10, and spurs 22 may be integrally constructed of the same thin resilient material while grasping members 18 may be fixed to legs 6 and 8 by welding or crimping or other suitable permanent attachment means.

Body 4 or segments thereof may be coated with an electrically insulating polymer coating 7 or an insulating sleeve to prevent the inadvertent establishment of an electric circuit from one or both of separated ends 14, 16 to a member of the automobile chassis in which wire bundle 9 is located.

Figure 3:
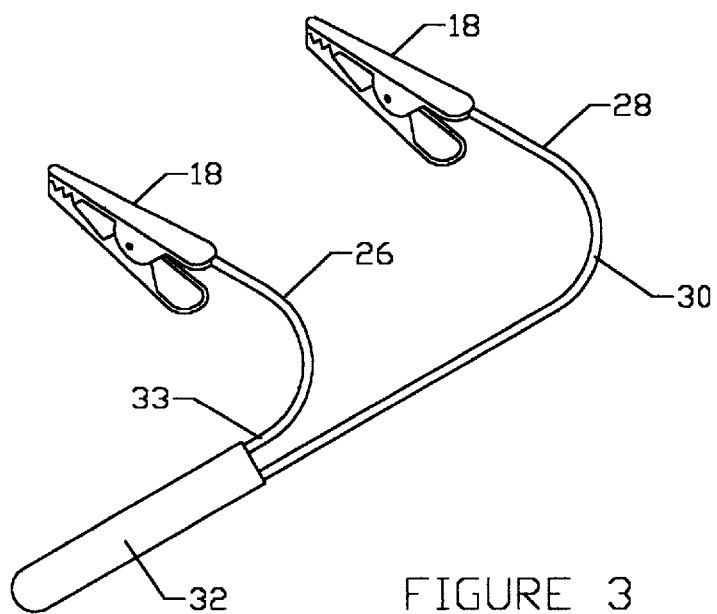
FIG. 3 is a front left perspective of an alternate embodiment of the invention having a handle extending from the body of the invention.

Referring now to FIG. 3, an alternate embodiment of the invention is depicted wherein certain elements in common with the preferred embodiment are employed, namely grasping elements 18 are employed at each end of spaced apart legs 26 and 28 of generally U-shaped. body 30. Body 30 includes a handle member 32 offset generally perpendicularly from body 30, handle member 32 enclosing a formed loop of the same thin material of which legs 26 and 28 are formed. Spring steel wire may again be used for the thin material of body 30. Handle member 32 may be constructed of an electrically insulative material such as an insulating polymer which permits flexure of the loop 33 of handle 32, thereby allowing some selective variation in the spacing between legs 26 and 28. The offset handle member 32 allows placement and removal of this alternate embodiment of the invention in restricted places.

Figure 4:
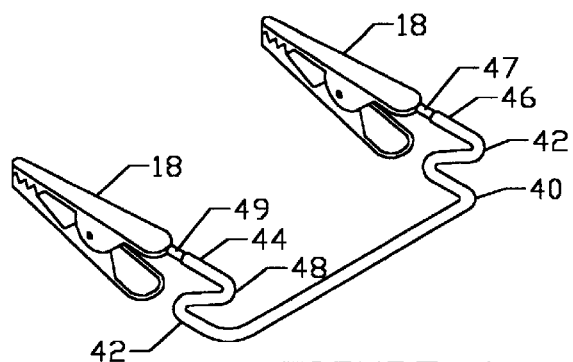
FIG. 4 is a front left perspective of a second alternate embodiment of the invention for use in limited spaces.

FIG. 4 illustrates another alternate embodiment of the invention having a shorter, generally U-shaped body 40 having generally parallel legs 46 and 48 with Z-shaped segments 42 along each leg. Grasping members 18 are fixed to the free ends 47 and 49 of body 40. An electrically non-conductive sleeve 44 is applied along substantially the entire length of body 40.

Figure 5:
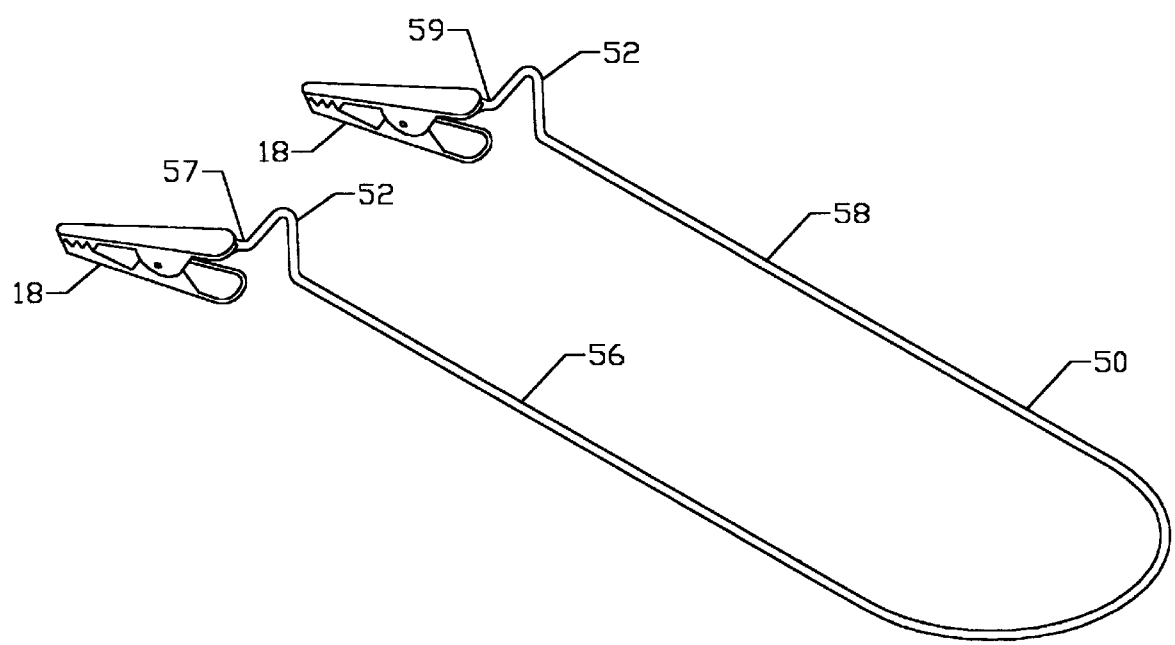
FIG. 5 is a front left perspective of another alternate embodiment of the invention having a non linear body.

FIG. 5 illustrates yet another embodiment of the invention wherein U-shaped body 50 is elongate, having spaced apart legs 56 and 58 which rest in a generally co-parallel position and having grasping elements 18 which are fixed to free ends 57 and 59 respectively of leg 56 and 58. Each of free ends 57 and 59 is disposed at an acute angle from the axis of legs 56 and 58 respectively, resulting in this alternate embodiment of the invention being non-linear. Spur elements 52 are formed along each of legs 56 and 58 adjacent the free ends 57 and 59 thereof.

Figure 6:
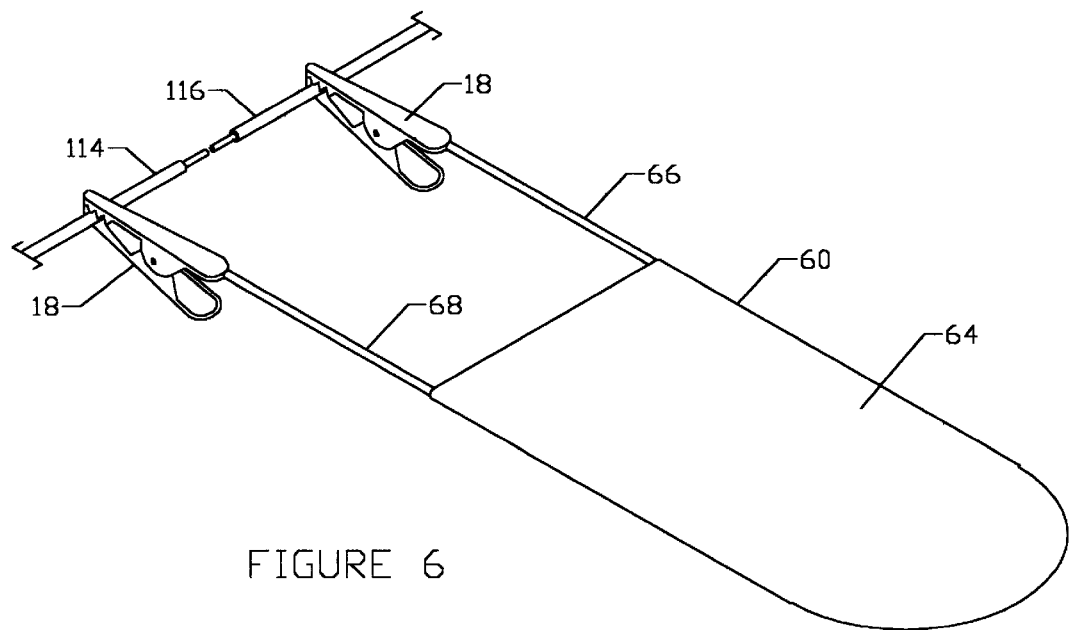
FIG. 6 is a front left perspective of yet another embodiment of the invention which is provided with an insulating handle joining the legs of the U-shaped body, the handle allowing flexation to permit the spacing of the clips of the invention to be selectively varied.

FIG. 6 discloses another alternate embodiment of the invention useful in grasping and retaining a wide variety of items in a fixed relationship. In FIG. 6, the alternate embodiment invention is shown grasping opposing wire ends 114 and 116 which may be desired to be held in juxtaposition for their joinder or other operations. The alternate embodiment of FIG. 6 comprises an elongate U-shaped body 60 having generally parallel legs 66 and 68 on the free ends of which are mounted grasping members 18. A flexible shroud 64 is employed about the joined segments of legs 66 and 68 such that legs 66 and 68 may be manually urged into closer disposition when shroud 64 is manually compressed by a user; or legs 66 and 68 may be diverged by manual separation thereof. Shroud 64 is constructed of non-electrically conductive material to assist in prevention of undesired electrical shorting.

Having described the invention, I claim:

1. Holding apparatus for selective grasping and positioning of discrete objects, comprising a generally U-shaped elongate body having opposing legs, the legs each having an end, each end provided with a grasping member capable of selectively retaining a discrete object, at least one of said legs provided with an open loop along the length thereof, said open loop extends from said at least one leg.

2. The holding apparatus of claim 1 wherein each grasping member is an alligator clip.

3. The holding apparatus of claim 1 wherein said body is nonlinear.

4. The holding apparatus of claim 1 wherein said open loop is integral with said body.

5. The holding apparatus of claim 1 wherein said loop is a Z-shaped segment of said leg.

6. The holding apparatus of claim 1 wherein each of said legs is provided with an open loop along the length thereof, the open loop of each of said legs extends generally transversely from said leg.

7. The holding apparatus of claim 6 wherein said body and said legs are an integral thin wire of spring steel, each of said open loops is spaced apart from the end of said leg.

8. Apparatus to grasp the separated ends of a broken conductor wire within a bundle of wires, and to isolate the ends from the bundle of wires comprising a generally U-shaped elongate body having opposing legs, the legs each having a free end, said legs being integral with said body, each of said legs being substantially linear, each free end provided with a grasping element, each grasping element selectively retainable to a separated end of the broken wire, said legs biased to maintain a substantially parallel relationship therebetween, at least one of said legs is provided with at least one spur along the length thereof, the spur in interactive contact with the bundle of wires when said grasping elements are retained to said separated ends of said broken conductor wire.

9. The apparatus of claim 8 wherein said spur is an open loop along said body.

10. The apparatus of claim 9 wherein said body and said legs are a thin wire of spring steel, the grasping elements are alligator clips.

11. The apparatus of claim 10 wherein said body and said legs are covered with an electrical insulator.

12. The apparatus of claim 10 wherein said body and said legs are coated with an electrically insulating polymer.

13. The apparatus of claim 10 wherein each of said legs is provided with an open loop along the length thereof, the open loop of each of said legs extends generally transversely from said leg.

* * * * *